US009418671B2

(12) United States Patent
Gao

(10) Patent No.: US 9,418,671 B2
(45) Date of Patent: Aug. 16, 2016

(54) ADAPTIVE HIGH-PASS POST-FILTER

(71) Applicant: Huawei Technologies Co., Ltd., Shenzhen (CN)

(72) Inventor: Yang Gao, Mission Viejo, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 14/459,100

(22) Filed: Aug. 13, 2014

(65) Prior Publication Data

US 2015/0051905 A1 Feb. 19, 2015

Related U.S. Application Data

(60) Provisional application No. 61/866,459, filed on Aug. 15, 2013.

(51) Int. Cl.

| | |
|---|---|
| ***G10L 21/00*** | (2013.01) |
| ***G10L 25/93*** | (2013.01) |
| ***G10L 21/02*** | (2013.01) |
| ***G10L 19/00*** | (2013.01) |
| ***G10L 19/12*** | (2013.01) |
| ***G10L 25/00*** | (2013.01) |
| ***G10L 13/00*** | (2006.01) |
| ***G10L 13/06*** | (2013.01) |
| ***G10L 19/02*** | (2013.01) |
| ***G06F 15/00*** | (2006.01) |
| ***G10L 21/04*** | (2013.01) |

(Continued)

(52) U.S. Cl.

CPC ............... *G10L 19/125* (2013.01); *G10L 19/26* (2013.01); *G10L 2019/0011* (2013.01)

(58) Field of Classification Search

CPC .. G11C 2207/16; G10L 25/90; G10L 15/265; G10L 15/22; G10L 15/30; G10L 19/12; G10L 19/0212; G10L 19/008; G10L 13/04; G10L 21/0208; G10L 21/04; H05K 999/99; H04B 1/665

See application file for complete search history.

(56) References Cited

U.S. PATENT DOCUMENTS 3,911,776 A * 10/1975 Beigel ...................... G10H 1/14 327/47
4,454,609 A * 6/1984 Kates ................. G10L 21/0364 381/106
5,233,660 A * 8/1993 Chen ...................... G10L 19/08 375/244

(Continued)

FOREIGN PATENT DOCUMENTS

CN 1555175 A 12/2004
WO 0011650 3/2000

(Continued)

*Primary Examiner* — Pierre-Louis Desir
*Assistant Examiner* — Anne Thomas-Homescu
(74) *Attorney, Agent, or Firm* — Slater Matsil, LLP

(57) ABSTRACT

In accordance with an embodiment of the present invention, a method of speech processing included receiving a coded audio signal having coding noise. The method further includes generating a decoded audio signal from the coded audio signal, and determining a pitch corresponding to the fundamental frequency of the audio signal. The method also includes determining the minimum allowable pitch and determining if the pitch of the audio signal is less than the minimum allowable pitch. If the pitch of the audio signal is less than the minimum allowable pitch, applying an adaptive high pass filter on the decoded audio signal to lower the coding noise at frequencies below the fundamental frequency.

17 Claims, 13 Drawing Sheets

(51) Int. Cl.
*G10L 19/125* (2013.01)
*G10L 19/26* (2013.01)

(56) References Cited

U.S. PATENT DOCUMENTS 5,261,027 A * 11/1993 Taniguchi ............... G10L 19/12 704/200
5,451,951 A * 9/1995 Elliott ..................... G06T 9/008 34/106
5,677,951 A 10/1997 Gay
5,732,388 A 3/1998 Hoege et al.
5,732,389 A * 3/1998 Kroon ..................... G10L 25/93 704/214
5,751,903 A * 5/1998 Swaminathan ......... G10L 19/06 704/219
5,774,838 A * 6/1998 Miseki .................. G10L 19/005 704/207
5,864,797 A * 1/1999 Fujimoto .............. G10L 19/113 704/220
5,875,423 A * 2/1999 Matsuoka ............... G10L 19/18 704/220
5,884,251 A * 3/1999 Kim ........................ G10L 19/12 704/219
5,924,062 A * 7/1999 Maung .................... G10L 19/12 704/217
6,061,648 A * 5/2000 Saito ..................... G10L 21/028 381/94.1
6,104,992 A * 8/2000 Gao ...................... G10L 19/005 704/220
6,128,591 A * 10/2000 Taori ....................... G10L 19/18 704/211
6,138,092 A * 10/2000 Zinser, Jr. ............... G10L 19/12 704/208
6,138,093 A * 10/2000 Ekudden ................. G10L 19/26 704/205
6,330,533 B2 12/2001 Su et al.
6,363,340 B1 3/2002 Sluijter et al.
6,385,578 B1 * 5/2002 Lee ....................... G10L 19/083 381/94.1
6,449,590 B1 9/2002 Gao
6,504,838 B1 * 1/2003 Kwan ..................... G10L 25/90 370/352
6,507,814 B1 * 1/2003 Gao ...................... G10L 19/005 704/219
6,526,378 B1 * 2/2003 Tasaki ................. G10L 21/0208 704/205
6,556,966 B1 4/2003 Gao
6,574,593 B1 * 6/2003 Gao ...................... G10L 19/167 704/222
6,584,438 B1 6/2003 Manjunath et al.
6,675,144 B1 * 1/2004 Tucker .................. G10L 21/038 704/219
6,678,651 B2 1/2004 Gao
6,704,701 B1 * 3/2004 Gao .................... G10L 21/0364 704/207
6,714,907 B2 3/2004 Gao
7,117,156 B1 * 10/2006 Kapilow ............... G10L 19/005 370/281
7,133,823 B2 11/2006 Gao
7,272,556 B1 * 9/2007 Aguilar ................. G10L 19/093 704/201
8,010,351 B2 8/2011 Gao
8,150,682 B2 4/2012 Nongpiur et al.
8,194,872 B2 6/2012 Buck et al.
2002/0007269 A1 * 1/2002 Gao ........................ G10L 19/10 704/212
2002/0103638 A1 * 8/2002 Gao ........................ G10L 19/08 704/207
2003/0036905 A1 * 2/2003 Toguri .................... G10L 17/02 704/250
2003/0154073 A1 * 8/2003 Ota ....................... G10L 19/018 704/207
2003/0177004 A1 9/2003 Jabri et al.
2003/0204543 A1 * 10/2003 Yoon ..................... G06F 17/142 708/300
2004/0073420 A1 * 4/2004 Lee ......................... G10L 25/90 704/207
2004/0098255 A1 5/2004 Kovesi et al.
2004/0158463 A1 * 8/2004 Jabri ..................... G10L 19/173 704/219
2004/0181411 A1 * 9/2004 Gao ...................... G10L 19/005 704/262
2005/0023343 A1 * 2/2005 Tsuchinaga ........... G10L 19/018 235/382
2005/0053130 A1 * 3/2005 Jabri ....................... G10L 19/12 375/240
2005/0065788 A1 * 3/2005 Stachurski ............. G10L 19/20 704/229
2005/0137863 A1 * 6/2005 Jasiuk ..................... G10L 19/09 704/222
2005/0165603 A1 * 7/2005 Bessette .............. G10L 21/0364 704/200.1
2005/0278169 A1 * 12/2005 Hardwick ............. G10L 19/005 704/223
2006/0089833 A1 * 4/2006 Su ........................... G10L 19/09 704/230
2006/0100859 A1 * 5/2006 Jelinek .................... G10L 19/24 704/201
2006/0153176 A1 * 7/2006 Caswell .................. H04L 69/04 370/356
2007/0091873 A1 * 4/2007 LeBlanc .................. H04B 3/23 370/352
2008/0027711 A1 * 1/2008 Rajendran ............. G10L 19/167 704/201
2008/0065387 A1 * 3/2008 Cross, Jr. .............. G10L 17/005 704/270
2008/0147384 A1 6/2008 Su et al.
2008/0154586 A1 * 6/2008 Gao ........................ G10L 19/10 704/223
2008/0195383 A1 * 8/2008 Shlomot ............... G10L 19/012 704/205
2008/0288246 A1 11/2008 Su et al.
2009/0150143 A1 * 6/2009 Kim ........................ G10L 19/26 704/203
2009/0222273 A1 * 9/2009 Massaloux .............. G10L 19/10 704/500
2009/0240491 A1 * 9/2009 Reznik .................... G10L 19/24 704/219
2009/0299736 A1 * 12/2009 Sato ........................ G10L 19/04 704/207
2010/0010810 A1 * 1/2010 Morii ...................... G10L 19/26 704/207
2010/0063806 A1 * 3/2010 Gao ...................... G10L 19/022 704/207
2010/0063808 A1 * 3/2010 Gao ...................... G10L 19/022 704/226
2010/0070269 A1 * 3/2010 Gao ........................ G10L 19/04 704/207
2010/0070270 A1 3/2010 Gao
2010/0074535 A1 3/2010 Bennett
2010/0076755 A1 * 3/2010 Morii .................... G01L 21/038 704/220
2010/0088091 A1 * 4/2010 Lee ......................... G10L 19/12 704/219
2010/0106492 A1 * 4/2010 Sato ...................... G10L 19/125 704/219
2010/0106507 A1 * 4/2010 Muesch ............... H04R 25/356 704/270.1
2010/0121646 A1 * 5/2010 Ragot ................. G10L 19/0204 704/500
2010/0211384 A1 8/2010 Qi et al.
2010/0217585 A1 * 8/2010 Karlsson ............... G10L 19/008 704/219
2010/0228557 A1 * 9/2010 Chen ..................... G10L 21/038 704/500
2010/0262420 A1 * 10/2010 Herre ...................... G10L 19/20 704/201
2010/0280823 A1 * 11/2010 Shlomot ............... G10L 19/012 704/201
2010/0318349 A1 * 12/2010 Kovesi .................. G10L 19/005 704/207
2010/0332221 A1 * 12/2010 Yamanashi ........... G10L 21/038 704/207

(56) References Cited

U.S. PATENT DOCUMENTS

| | | | | |
|---|---|---|---|---|
| 2011/0007827 | A1* | 1/2011 | Virette | G10L 19/005 375/259 |
| 2011/0010168 | A1* | 1/2011 | Yu | G10L 19/093 704/219 |
| 2011/0046947 | A1* | 2/2011 | Vaillancourt | G10L 19/26 704/226 |
| 2011/0173010 | A1* | 7/2011 | Lecomte | G10L 19/20 704/500 |
| 2011/0257984 | A1* | 10/2011 | Virette | G10L 19/26 704/503 |
| 2011/0295598 | A1* | 12/2011 | Yang | G10L 21/038 704/205 |
| 2011/0301946 | A1* | 12/2011 | Satoh | H04Q 1/46 704/219 |
| 2012/0016668 | A1* | 1/2012 | Gao | G10L 21/038 704/203 |
| 2012/0039414 | A1* | 2/2012 | Fang | G10L 19/005 375/295 |
| 2012/0265534 | A1* | 10/2012 | Coorman | G10L 13/033 704/265 |
| 2012/0271644 | A1* | 10/2012 | Bessette | G10L 19/03 704/500 |
| 2012/0296659 | A1* | 11/2012 | Oshikiri | G10L 19/26 704/500 |
| 2012/0323567 | A1* | 12/2012 | Gao | G10L 19/09 704/201 |
| 2013/0085751 | A1* | 4/2013 | Takahashi | G10L 19/018 704/205 |
| 2013/0085752 | A1* | 4/2013 | Kawashima | G10L 19/22 704/225 |
| 2013/0096912 | A1* | 4/2013 | Resch | G10L 19/125 704/207 |
| 2013/0121508 | A1* | 5/2013 | Vaillancourt | H03G 3/20 381/98 |
| 2013/0166287 | A1* | 6/2013 | Gao | G10L 25/90 704/207 |
| 2013/0166288 | A1* | 6/2013 | Gao | G10L 25/90 704/207 |
| 2013/0246055 | A1* | 9/2013 | Gao | G10L 19/04 704/205 |
| 2013/0262128 | A1* | 10/2013 | Teutsch | G10L 21/0364 704/500 |
| 2013/0332171 | A1* | 12/2013 | Avendano | G10L 19/12 704/264 |
| 2014/0006017 | A1* | 1/2014 | Sen | G10L 21/003 704/208 |
| 2014/0114653 | A1* | 4/2014 | Laaksonen | G10L 25/93 704/208 |
| 2014/0236585 | A1* | 8/2014 | Subasingha | G10L 25/90 704/207 |
| 2014/0236588 | A1* | 8/2014 | Subasingha | G10L 19/07 704/219 |
| 2014/0249807 | A1* | 9/2014 | Vaillancourt | G10L 21/04 704/207 |
| 2014/0297287 | A1* | 10/2014 | Newman | G10L 15/08 704/275 |
| 2015/0025879 | A1* | 1/2015 | Liu | G10L 19/038 704/230 |
| 2015/0194163 | A1* | 7/2015 | Hiwasaki | G10L 19/125 704/219 |
| 2015/0262588 | A1* | 9/2015 | Tsutsumi | G10L 19/125 704/207 |
| 2015/0332707 | A1* | 11/2015 | Disch | G10L 21/038 704/205 |

FOREIGN PATENT DOCUMENTS

| | | | |
|---|---|---|---|
| WO | 0011652 | | 3/2000 |
| WO | 0011654 | | 3/2000 |
| WO | 0103125 | | 1/2001 |
| WO | 0223537 | A1 | 3/2002 |
| WO | 03023764 | A1 | 3/2003 |
| WO | 2004084180 | A2 | 9/2004 |
| WO | 2010091554 | A1 | 8/2010 |

* cited by examiner

ADAPTIVE HIGH-PASS POST-FILTER

This application claims the benefit of U.S. Provisional Application No. 61/866,459, filed on Aug. 15, 2013, which application is hereby incorporated herein by reference.

TECHNICAL FIELD

The present invention is generally in the field of signal coding. In particular, the present invention is in the field of low bit rate speech coding.

BACKGROUND

Speech coding refers to a process that reduces the bit rate of a speech file. Speech coding is an application of data compression of digital audio signals containing speech. Speech coding uses speech-specific parameter estimation using audio signal processing techniques to model the speech signal, combined with generic data compression algorithms to represent the resulting modeled parameters in a compact bitstream. The objective of speech coding is to achieve savings in the required memory storage space, transmission bandwidth and transmission power by reducing the number of bits per sample such that the decoded (decompressed) speech is perceptually indistinguishable from the original speech.

However, speech coders are lossy coders, i.e., the decoded signal is different from the original. Therefore, one of the goals in speech coding is to minimize the distortion (or perceptible loss) at a given bit rate, or minimize the bit rate to reach a given distortion.

Speech coding differs from other forms of audio coding in that speech is a much simpler signal than most other audio signals, and a lot more statistical information is available about the properties of speech. As a result, some auditory information which is relevant in audio coding can be unnecessary in the speech coding context. In speech coding, the most important criterion is preservation of intelligibility and "pleasantness" of speech, with a constrained amount of transmitted data.

The intelligibility of speech includes, besides the actual literal content, also speaker identity, emotions, intonation, timbre etc. that are all important for perfect intelligibility. The more abstract concept of pleasantness of degraded speech is a different property than intelligibility, since it is possible that degraded speech is completely intelligible, but subjectively annoying to the listener.

Traditionally, all parametric speech coding methods make use of the redundancy inherent in the speech signal to reduce the amount of information that must be sent and to estimate the parameters of speech samples of a signal at short intervals. This redundancy primarily arises from the repetition of speech wave shapes at a quasi-periodic rate, and the slow changing spectral envelop of speech signal.

The redundancy of speech wave forms may be considered with respect to several different types of speech signal, such as voiced and unvoiced speech signals. Voiced sounds, e.g., 'a', 'b', are essentially due to vibrations of the vocal cords, and are oscillatory. Therefore, over short periods of time, they are well modeled by sums of periodic signals such as sinusoids. In other words, for voiced speech, the speech signal is essentially periodic. However, this periodicity may be variable over the duration of a speech segment and the shape of the periodic wave usually changes gradually from segment to segment. A low bit rate speech coding could greatly benefit from exploring such periodicity. The voiced speech period is also called pitch, and pitch prediction is often named Long- Term Prediction (LTP). In contrast, unvoiced sounds such as 's', 'sh', are more noise-like. This is because unvoiced speech signal is more like a random noise and has a smaller amount of predictability.

In either case, parametric coding may be used to reduce the redundancy of the speech segments by separating the excitation component of speech signal from the spectral envelop component, which changes at slower rate. The slowly changing spectral envelope component can be represented by Linear Prediction Coding (LPC) also called Short-Term Prediction (STP). A low bit rate speech coding could also benefit a lot from exploring such a Short-Term Prediction. The coding advantage arises from the slow rate at which the parameters change. Yet, it is rare for the parameters to be significantly different from the values held within a few milliseconds.

In more recent well-known standards such as G.723.1, G.729, G.718, Enhanced Full Rate (EFR), Selectable Mode Vocoder (SMV), Adaptive Multi-Rate (AMR), Variable-Rate Multimode Wideband (VMR-WB), or Adaptive Multi-Rate Wideband (AMR-WB), Code Excited Linear Prediction Technique ("CELP") has been adopted. CELP is commonly understood as a technical combination of Coded Excitation, Long-Term Prediction and Short-Term Prediction. CELP is mainly used to encode speech signal by benefiting from specific human voice characteristics or human vocal voice production model. CELP Speech Coding is a very popular algorithm principle in speech compression area although the details of CELP for different codecs could be significantly different. Owing to its popularity, CELP algorithm has been used in various ITU-T, MPEG, 3GPP, and 3GPP2 standards. Variants of CELP include algebraic CELP, relaxed CELP, low-delay CELP and vector sum excited linear prediction, and others. CELP is a generic term for a class of algorithms and not for a particular codec.

The CELP algorithm is based on four main ideas. First, a source-filter model of speech production through linear prediction (LP) is used. The source-filter model of speech production models speech as a combination of a sound source, such as the vocal cords, and a linear acoustic filter, the vocal tract (and radiation characteristic). In implementation of the source-filter model of speech production, the sound source, or excitation signal, is often modelled as a periodic impulse train, for voiced speech, or white noise for unvoiced speech. Second, an adaptive and a fixed codebook is used as the input (excitation) of the LP model. Third, a search is performed in closed-loop in a "perceptually weighted domain." Fourth, vector quantization (VQ) is applied.

SUMMARY

In accordance with an embodiment of the present invention, a method of speech processing included receiving a coded audio signal having coding noise. The method further includes generating a decoded audio signal from the coded audio signal, and determining a pitch corresponding to the fundamental frequency of the audio signal. The method also includes determining the minimum allowable pitch and determining if the pitch of the audio signal is less than the minimum allowable pitch. If the pitch of the audio signal is less than the minimum allowable pitch, applying an adaptive high pass filter on the decoded audio signal to lower the coding noise at frequencies below the fundamental frequency.

In accordance with an alternative embodiment of the present invention, a method of speech processing comprises receiving a voiced wideband spectrum comprising coding noise, determining a pitch corresponding to the fundamental frequency of the voiced wideband spectrum, and determining the minimum allowable pitch. The method further includes determining that the pitch of the voiced wideband spectrum is less than the minimum allowable pitch. An adaptive high pass filter having a cut-off frequency less than the fundamental frequency is applied on the voiced wideband spectrum to lower the coding noise at frequencies below the fundamental frequency.

In accordance with an alternative embodiment of the present invention, a code excitation linear predictive (CELP) decoder comprises an excitation codebook for outputting a first excitation signal of a speech signal, a first gain stage for amplifying the first excitation signal from the excitation codebook, an adaptive codebook for outputting a second excitation signal of the speech signal, and a second gain stage for amplifying the second excitation signal from the adaptive codebook. The amplified first excitation code vector is added with the amplified second excitation code vector at an adder. A short term prediction filter is configured to filter the output of the adder and output a synthesized speech. An adaptive high pass filter is coupled to the output of the short term prediction filter. The adaptive high filter comprises an adjustable cut-off frequency to dynamically filter out coding noise below the fundamental frequency in the synthesized speech output.

BRIEF DESCRIPTION OF THE DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In modern audio/speech digital signal communication system, a digital signal is compressed at an encoder, and the compressed information or bit-stream can be packetized and sent to a decoder frame by frame through a communication channel. The decoder receives and decodes the compressed information to obtain the audio/speech digital signal.

Figure 1:
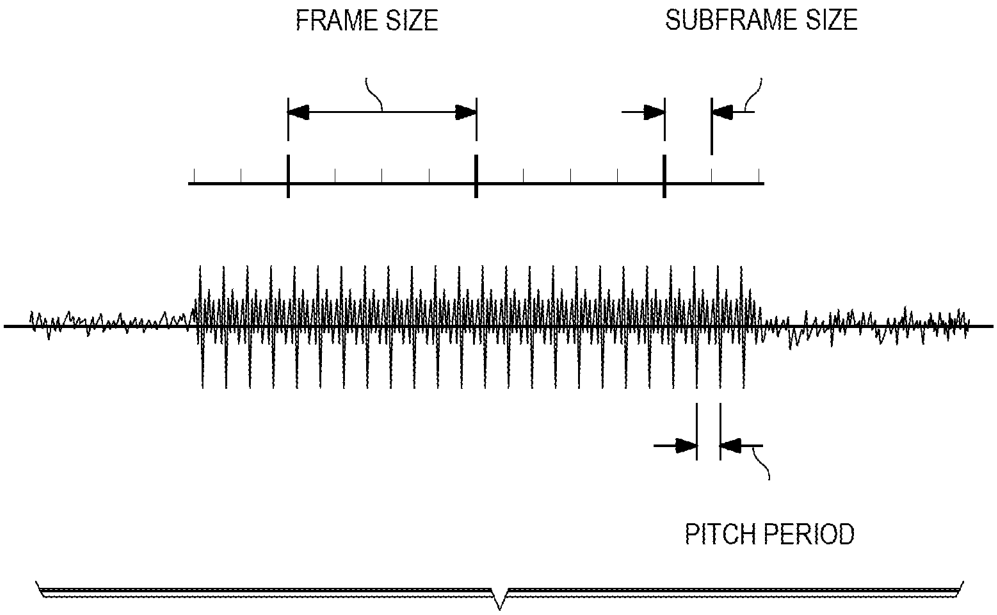
Figure 1 (PRIOR ART)
FIG. 1 illustrates an example that the pitch period is smaller than the subframe size.
Figure 2:
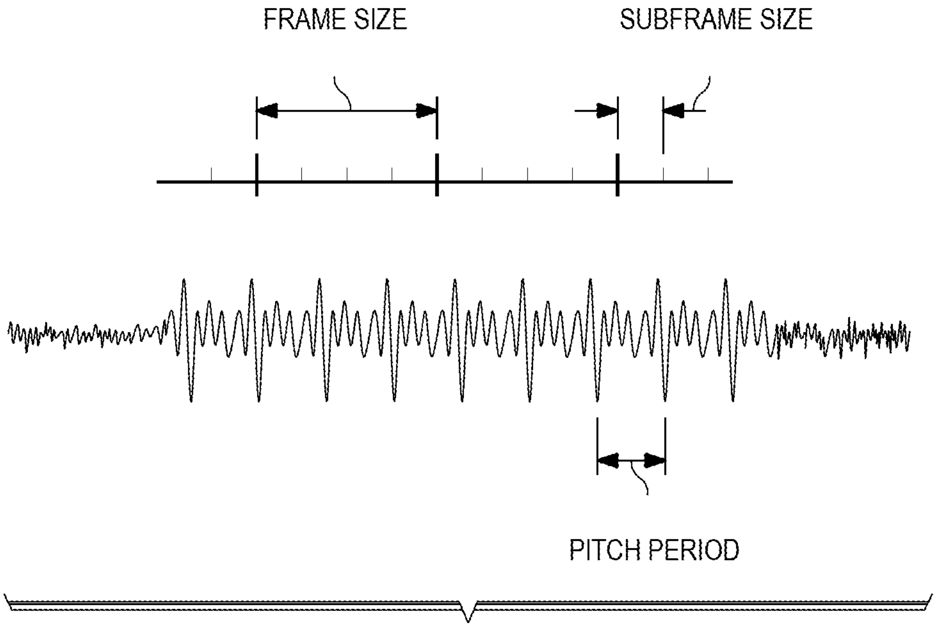
Figure 2 (PRIOR ART)
FIG. 2 illustrates an example in which the pitch period is larger than the subframe size and smaller than the half frame size.

FIGS. 1 and 2 illustrate examples of schematic speech signals and it's relationship to frame size and subframe size in the time domain. FIGS. 1 and 2 illustrate a frame including a plurality of subframes.

The samples of the input speech are divided into blocks of samples each, called frames, e.g., 80-240 samples or frames. Each frame is divided into smaller blocks of samples, each, called subframes. At the sampling rate of 8 kHz, 12.8 kHz, or 16 kHz, the speech coding algorithm is such that the nominal frame duration is in the range of ten to thirty milliseconds, and typically twenty milliseconds. In the illustrated FIG. 1, the frame has a frame size 1 and a subframe size 2, in which each frame is divided into 4 subframes.

Referring to the lower or bottom portions of FIGS. 1 and 2, the voiced regions in a speech look like a near periodic signal in the time domain representation. The periodic opening and closing of the vocal folds of the speaker results in the harmonic structure in voiced speech signals. Therefore, over short periods of time, the voiced speech segments may be treated to be periodic for all practical analysis and processing. The periodicity associated with such segments is defined as "Pitch Period" or simply "pitch" in the time domain and "Pitch frequency or Fundamental Frequency $f_0$" in the frequency domain. The inverse of the pitch period is the fundamental frequency of speech. The terms pitch and fundamental frequency of speech are frequently used interchangeably.

For most voiced speech, one frame contains more than two pitch cycles. FIG. 1 further illustrates an example that the pitch period 3 is smaller than the subframe size 2. In contrast, FIG. 2 illustrates an example in which the pitch period 4 is larger than the subframe size 2 and smaller than the half frame size.

In order to encode speech signal more efficiently, speech signal may be classified into different classes and each class is encoded in a different way. For example, in some standards such as G.718, VMR-WB, or AMR-WB, speech signal is classified into UNVOICED, TRANSITION, GENERIC, VOICED, and NOISE.

For each class, LPC or STP filter is always used to represent spectral envelope. However, the excitation to the LPC filter may be different. UNVOICED and NOISE classes may be coded with a noise excitation and some excitation enhancement. TRANSITION class may be coded with a pulse excitation and some excitation enhancement without using adaptive codebook or LTP.

GENERIC may be coded with a traditional CELP approach such as Algebraic CELP used in G.729 or AMR-WB, in which one 20 ms frame contains four 5 ms subframes. Both the adaptive codebook excitation component and the fixed codebook excitation component are produced with some excitation enhancement for each subframe. Pitch lags for the adaptive codebook in the first and third subframes are coded in a full range from a minimum pitch limit PIT_MIN to a maximum pitch limit PIT_MAX. Pitch lags for the adaptive codebook in the second and fourth subframes are coded differentially from the previous coded pitch lag.

VOICED classes may be coded in such a way that they are slightly different from GENERIC class. For example, pitch lag in the first subframe may be coded in a full range from a minimum pitch limit PIT_MIN to a maximum pitch limit PIT_MAX. Pitch lags in the other subframes may be coded differentially from the previous coded pitch lag. As an illustration, supposing the excitation sampling rate is 12.8 kHz, then the example PIT_MIN value can be 34 and PIT_MAX can be 231.

Most CELP codecs work well for normal speech signals. However, low bit rate CELP codecs often fail for music signals and/or singing voice signals. If the pitch coding range is from PIT_MIN to PIT_MAX and the real pitch lag is smaller than PIT_MIN, the CELP coding performance may be bad perceptually due to double pitch or triple pitch. For example, the pitch range from PIT_MIN=34 to PIT_MAX=231 for $F_s$=12.8 kHz sampling frequency adapts most human voices. However, real pitch lag of regular music or singing voiced signal may be much shorter than the minimum limitation PIT_MIN=34 defined in the above example CELP algorithm.

When the real pitch lag is P, the corresponding normalized fundamental frequency (or first harmonic) is $f_0=F_s/P$, where $F_s$ is the sampling frequency and $f_0$ is the location of the first harmonic peak in spectrum. So, for a given sampling frequency, the minimum pitch limitation PIT_MIN actually defines the maximum fundamental harmonic frequency limitation $F_M=F_s$/PIT_MIN for CELP algorithm.

Figure 3:
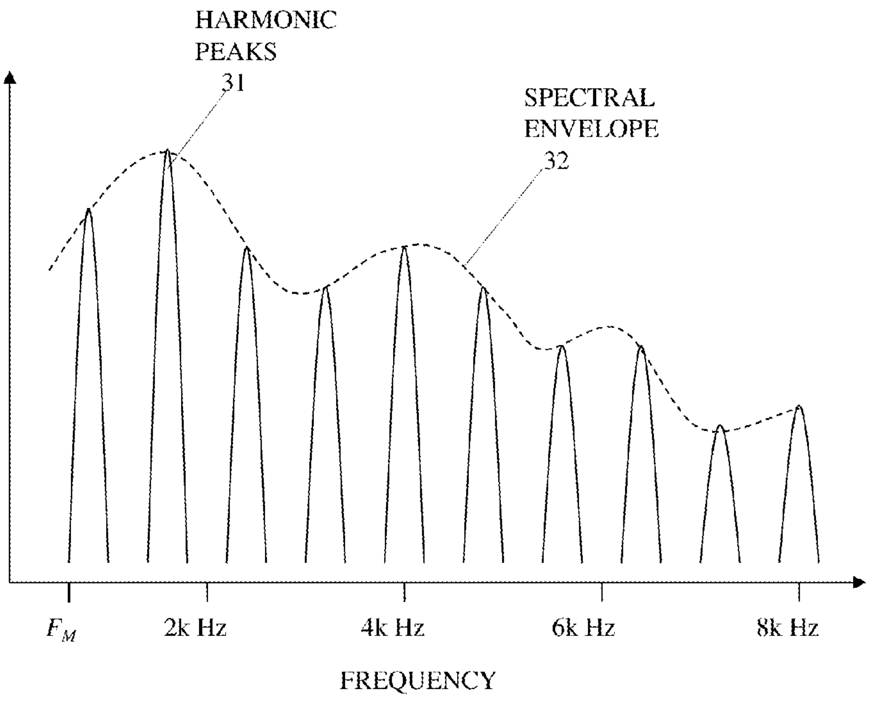
FIG. 3 illustrates an example of an original voiced wideband spectrum.
Figure 4:
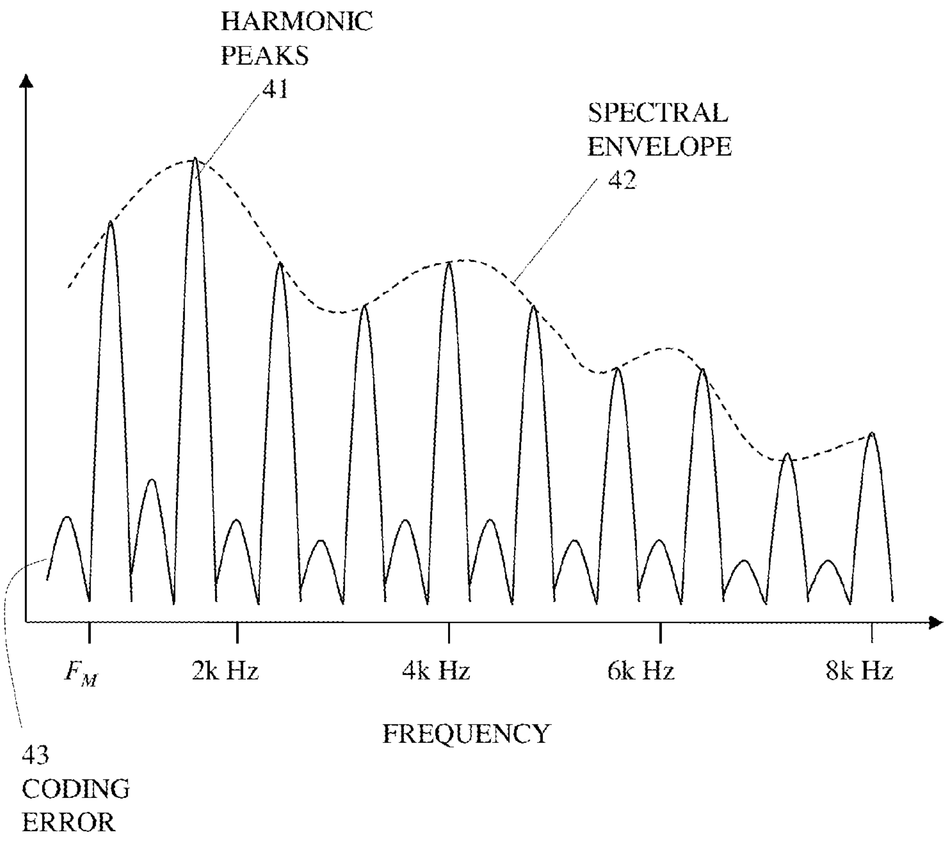
FIG. 4 illustrates a coded voiced wideband spectrum of the original voiced wideband spectrum illustrated in FIG. 3 using doubling pitch lag coding.

FIG. 3 illustrates an example of an original voiced wideband spectrum. FIG. 4 illustrates a coded voiced wideband spectrum of the original voiced wideband spectrum illustrated in FIG. 3 using doubling pitch lag coding. In other words, FIG. 3 illustrates a spectrum prior to coding and FIG. 4 illustrates the spectrum after coding.

In the example shown in FIG. 3, the spectrum is formed by harmonic peaks 31 and spectral envelope 32. The real fundamental harmonic frequency (the location of the first harmonic peak) is already beyond the maximum fundamental harmonic frequency limitation $F_M$ so that the transmitted pitch lag for CELP algorithm is not able to be equal to the real pitch lag and it could be double or multiple of the real pitch lag.

The wrong pitch lag transmitted with multiple of the real pitch lag can cause obvious quality degradation. In other words, when the real pitch lag for harmonic music signal or singing voice signal is smaller than the minimum lag limitation PIT_MIN defined in CELP algorithm, the transmitted lag could be double, triple or multiple of the real pitch lag.

As a result, the spectrum of the coded signal with the transmitted pitch lag could be as shown in FIG. 4. As illustrated in FIG. 4, besides including harmonic peaks 41 and spectral envelope 42, unwanted small peaks 43 between the real harmonic peaks can be seen while the correct spectrum should be like the one in FIG. 3. Those small spectrum peaks in FIG. 4 could cause uncomfortable perceptual distortion.

One of the solutions to the above problem is to simply extend the minimum pitch lag limitation from PIT_MIN to PIT_MIN_EXT. For example, the pitch range from PIT_MIN=34 to PIT_MAX=231 for $F_s$=12.8 kHz sampling frequency is extended to the new pitch range from PIT_MIN_EXT=17 to PIT_MAX=231 so that the maximum fundamental harmonic frequency limitation is extended from $F_M=F_s$/PIT_MIN to $F_{M\_EXT}=F_s$/PIT_MIN_EXT. Although determining short pitch lag is more difficult than determining normal pitch lag, reliable algorithm of determining short pitch lag does exist.

Figure 5:
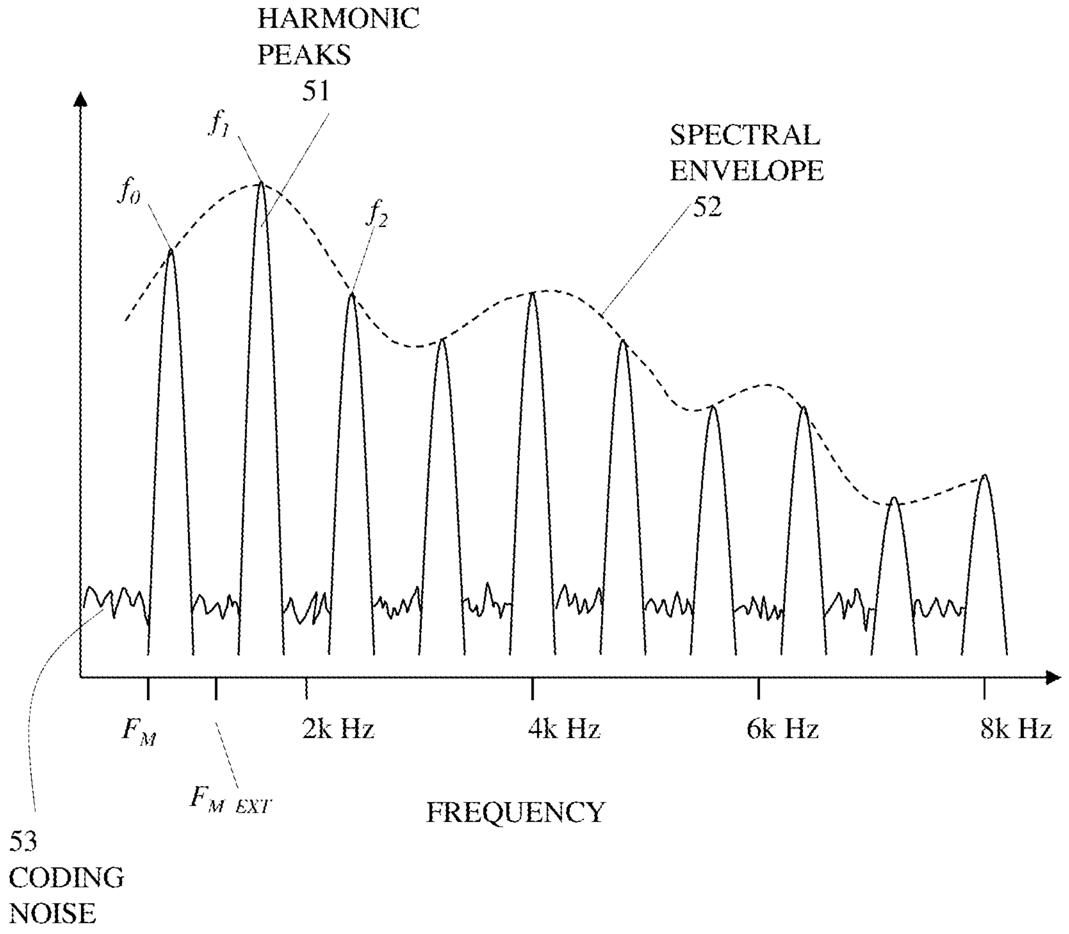
FIG. 5 illustrates an example of a coded voiced wideband spectrum of the original voiced wideband spectrum illustrated in FIG. 3 with correct short pitch lag coding.

FIG. 5 illustrates an example of a coded voiced wideband spectrum with correct short pitch lag coding.

Assuming that a correct short pitch is determined by a CELP encoder and transmitted to a CELP decoder, the perceptual quality of the decoded signal will be improved (from FIG. 4) to the one as shown in FIG. 5. Referring to FIG. 5, the coded voice wideband spectrum includes harmonic peaks 51, spectral envelope 52, and coding noise 53. The perceptual quality of the decoded signal shown in FIG. 5 sounds much better than the one in FIG. 4. However, when the pitch lag is short and the fundamental harmonic frequency $f_0$ is high, the low frequency coding noise 53 may be still heard by the listener.

Embodiments of the present invention overcome these and other problems by the use of an adaptive filter.

Usually, music harmonic signals or singing voice signals are more stationary than normal speech signals. Pitch lag (or fundamental frequency) of normal speech signal keeps changing all the time. However, pitch lag (or fundamental frequency) of music signal or singing voice signal often changes relatively slowly over quite long time duration. Slowly changing short pitch lag means that the corresponding harmonics are sharp and the distance between adjacent harmonics is large. For short pitch lag, it is important to have high precision. Assuming the short pitch range is defined from pitch=PIT_MIN_EXT to pitch=PIT_MIN, accordingly the first harmonic $f_0$ (fundamental frequency) ranges from $f_0=F_M$=Fs/PIT_MIN to $f_0=F_{M\_EXT}$=Fs/PIT_MIN_EXT. At the sampling frequency Fs=12.8 kHz, the example definition of the short pitch range ranges from pitch=PIT_MIN_EXT=17 to pitch=PIT_MIN=34, or from $f_0=F_M$=376 Hz to $f_0=F_{M\_EXT}$=753 Hz.

Assuming the short pitch lag is correctly detected, encoded and transmitted from a CELP encoder to a CELP decoder, the perceptual quality of the decoded signal shown in FIG. 5 with correct short pitch lag would sound much better than the one in FIG. 4 with wrong pitch lag. However, when the pitch lag is short and the fundamental harmonic frequency $f_0$ is high, the low frequency coding noise between 0 and $f_0$ Hz may be still obviously heard although the pitch lag is correct. This is because the region from 0 to $f_0$ Hz is so large that it lacks masking energy. The coding noise between $f_0$ and $f_1$ Hz is less audible than the coding noise between 0 and $f_0$ Hz, because the coding noise between $f_0$ and $f_1$ Hz is masked by both the first and the second harmonics $f_0$ and $f_1$ while the coding noise between 0 and $f_0$ Hz is mainly masked by one harmonic energy ($f_0$) only. Therefore, the coding noise between harmonics in high frequency region is less audible than the same amount of coding noise between harmonics in low frequency region because of human hearing masking principle.

Figure 6:
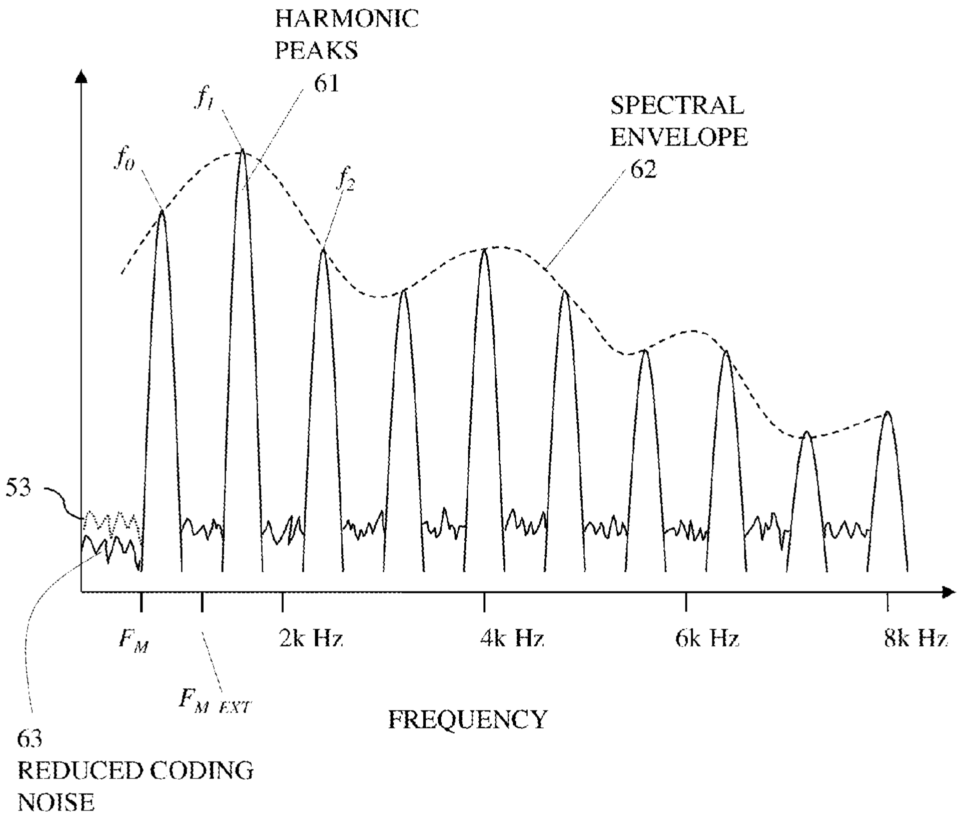
FIG. 6 is an example of coded voiced wideband spectrum of the original voiced wideband spectrum illustrated in FIG. 3 with correct short pitch lag coding in accordance with embodiments of the present invention.

FIG. 6 is an example of coded voiced wideband spectrum of the original voiced wideband spectrum illustrated in FIG. 3 with correct short pitch lag coding in accordance with embodiments of the present invention.

Referring to FIG. 6, the wideband spectrum includes harmonic peaks 61 and spectral envelope 62 along with coding errors. In this embodiment, the original coding noise (e.g., FIG. 5) is reduced by the application of an adaptive high-pass filter. FIG. 6 also shows the original coding noise 53 (from FIG. 5) along with a reduced coding noise 63.

Experimental tests also prove that when the coding noise between 0 and $f_0$ Hz is reduced as shown in FIG. 6 to the reduced coding noise 63, the perceptual quality of the decoded signal is improved.

In various embodiments, the reduction of the coding noise 63 between 0 and $f_0$ Hz may be realized by using an adaptive high-pass filter with a cut-off frequency less than $f_0$ Hz. An example is given here to explain one embodiment of designing the adaptive high-pass filter.

Suppose an order two adaptive high-pass filter is used to maintain low complexity as described in Equation (1).

$$F_{HP}(z) = \frac{1 + a_0 z^{-1} + a_1 z^{-2}}{1 + b_0 z^{-1} + b_1 z^{-2}} \quad (1)$$

Two zeros are located at 0 Hz so that $$a_0 = -2 \cdot r_0 \cdot \alpha_{sm}$$

$$a_1 = r_0 \cdot r_0 \cdot \alpha_{sm} \cdot \alpha_{sm} \quad (2)$$

In Equation (2) above, $r_0$ is a constant (for example, $r_0=0.9$) which represents the largest distance between zeros and the center on z-plane; $\alpha_{sm}$ ($0 \leq \alpha_{sm} \leq 1$) is a controlling parameter which is used to adaptively reduce the distance between zeros and the center on z-plane when the high-pass filter is not needed. Two poles on z-plane are placed at $0.9f_0 = 0.9F_s/\text{pitch}$ (Hz) as expressed in the following Equation (3)

$$b_0 = -2 \cdot r_1 \cdot \alpha_{sm} \cdot \cos(2\pi \cdot 0.9 F_{0\_sm})$$

$$b_1 = r_1 \cdot r_1 \cdot \alpha_{sm} \cdot \alpha_{sm} \quad (3)$$

In Equation (3), $r_1$ is a constant (for example, $r_1=0.87$) which represents the largest distance between the poles and the center on z-plane. $F_{0\_sm}$ is related to the fundamental frequency of short pitch signal and $\alpha_{sm}$ ($0 \leq \alpha_{sm} \leq 1$) is a controlling parameter which is used to adaptively reduce the distance between the poles and the center on z-plane when the high-pass filter is not needed. When $\alpha_{sm}$ becomes 0, actually no high pass post-filter is applied. In Equations (2) and (3), there are two variable parameters, $F_{0\_sm}$ and $\alpha_{sm}$. An example way of determining $F_{0\_sm}$ and $\alpha_{sm}$ is described in detail below.

```
If( (pitch is not available) or (coder is not CELP mode) or
   (signal is not voiced) or (signal is not periodic) ) {
          α =0;
          F0 = 1/PIT_MIN;
     }
     else {
          if (pitch< PIT_MIN) {
               α =1;
               F0 = 1/pitch;
          }
          else {
               α =0;
               F0 = 1/PIT_MIN;
          }
     }
```

$F_{0\_sm}$ is a smoothed version of the normalized fundamental frequency $F_0$ and is given as follows: $F_{0\_sm}=0.95\ F_{0\_sm}+0.05\ F_0$. $F_0$ is normalized by the sampling rate as $F_0$=fundamental frequency ($f_0$)/Sampling_Rate. As $f_0$=Sampling_Rate/Pitch, the normalized fundamental frequency $F_0=f_0$/Sampling_Rate=(Sampling_Rate/Pitch)/Sampling_Rate=1/Pitch.

In general, for higher bit rate, the $\alpha_{sm}$ is smoother and reduced more quickly because higher bit rate has less distortion than at lower bit rate.

```
if (bit rate ≥ 22.6kbps)
{
     if (α> αsm) {
          αsm = 0.9 αsm + 0.1α ;
     }
     else {
          αsm = max(0, αsm −0.02) ;
     }
}
else
{
     if (α> αsm) {
          αsm = 0.8 αsm + 0.2α ;
     }
     else {
          αsm = max(0, αsm −0.01) ;
     }
}
F0_sm = 0.95 F0_sm + 0.05 F0
```

In other words, as described above, the high-pass filter is not applied in instances where the pitch is not available, the coding was not performed using a CELP coder, the audio signal is not voiced, or the audio signal is not periodic. Embodiments of the invention also do not apply the high-pass filter to voiced audio signals in which the pitch is greater than the minimum allowed pitch (or the fundamental harmonic frequency is less than the maximum allowable fundamental harmonic frequency). Rather, in various embodiments, the high-pass filter is selectively applied only in cases in which the pitch is less than the minimum allowed pitch (or the fundamental harmonic frequency is greater than the maximum allowable fundamental harmonic frequency).

In various embodiments, subjective test results may be used to select an appropriate choice for the high pass filter. For example, listening test results may be used to identity and verify that the speech or music quality with short pitch lag is significantly improved after using the adaptive high-pass post-filter.

Figure 7:
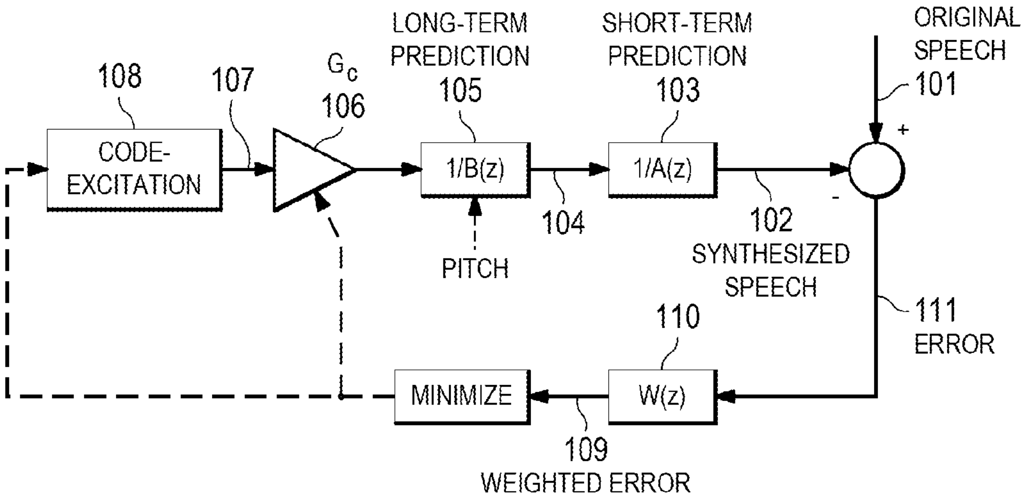
Figure 7 (PRIOR ART)
FIG. 7 illustrates operations performed during encoding of an original speech using a CELP encoder implementing an embodiment of the present invention.

FIG. 7 illustrates operations performed during encoding of an original speech using a CELP encoder implementing an embodiment of the present invention.

FIG. 7 illustrates a conventional initial CELP encoder where a weighted error 109 between a synthesized speech 102 and an original speech 101 is minimized often by using an analysis-by-synthesis approach, which means that the encoding (analysis) is performed by perceptually optimizing the decoded (synthesis) signal in a closed loop.

The basic principle that all speech coders exploit is the fact that speech signals are highly correlated waveforms. As an illustration, speech can be represented using an autoregressive (AR) model as in Equation (4) below.

$$X_n = \sum_{i=1}^{L} a_i X_{n-1} + e_n \quad (4)$$

In Equation (4), each sample is represented as a linear combination of the previous L samples plus a white noise. The weighting coefficients $a_1, a_2, \ldots a_L$, are called Linear Prediction Coefficients (LPCs). For each frame, the weighting coefficients $a_1, a_2, \ldots a_L$, are chosen so that the spectrum of $\{X_1, X_2, \ldots, X_N\}$, generated using the above model, closely matches the spectrum of the input speech frame.

Alternatively, speech signals may also be represented by a combination of a harmonic model and noise model. The harmonic part of the model is effectively a Fourier series representation of the periodic component of the signal. In general, for voiced signals, the harmonic plus noise model of speech is composed of a mixture of both harmonics and noise. The proportion of harmonic and noise in a voiced speech depends on a number of factors including the speaker characteristics (e.g., to what extent a speaker's voice is normal or breathy); the speech segment character (e.g. to what extent a speech segment is periodic) and on the frequency; the higher frequencies of voiced speech have a higher proportion of noise-like components.

Linear prediction model and harmonic noise model are the two main methods for modelling and coding of speech signals. Linear prediction model is particularly good at modelling the spectral envelop of speech whereas harmonic noise model is good at modelling the fine structure of speech. The two methods may be combined to take advantage of their relative strengths.

As indicated previously, before CELP coding, the input signal to the handset's microphone is filtered and sampled, for example, at a rate of 8000 samples per second. Each sample is then quantized, for example, with 13 bit per sample. The sampled speech is segmented into segments or frames of 20 ms (e.g., in this case 160 samples).

The speech signal is analyzed and its LP model, excitation signals and pitch are extracted. The LP model represents the spectral envelop of speech. It is converted to a set of line spectral frequencies (LSF) coefficients, which is an alternative representation of linear prediction parameters, because LSF coefficients have good quantization properties. The LSF coefficients can be scalar quantized or more efficiently they can be vector quantized using previously trained LSF vector codebooks.

The code-excitation includes a codebook comprising codevectors, which have components that are all independently chosen so that each codevector may have an approximately 'white' spectrum. For each subframe of input speech, each of the codevectors is filtered through the short-term linear prediction filter 103 and the long-term prediction filter 105, and the output is compared to the speech samples. At each subframe, the codevector whose output best matches the input speech (minimized error) is chosen to represent that subframe.

The coded excitation 108 normally comprises pulse-like signal or noise-like signal, which are mathematically constructed or saved in a codebook. The codebook is available to both the encoder and the receiving decoder. The coded excitation 108, which may be a stochastic or fixed codebook, may be a vector quantization dictionary that is (implicitly or explicitly) hard-coded into the codec. Such a fixed codebook may be an algebraic code-excited linear prediction or be stored explicitly.

A codevector from the codebook is scaled by an appropriate gain to make the energy equal to the energy of the input speech. Accordingly, the output of the coded excitation 108 is scaled by a gain $G_c$ 107 before going through the linear filters.

The short-term linear prediction filter 103 shapes the 'white' spectrum of the codevector to resemble the spectrum of the input speech. Equivalently, in time-domain, the short-term linear prediction filter 103 incorporates short-term correlations (correlation with previous samples) in the white sequence. The filter that shapes the excitation has an all-pole model of the form 1/A(z) (short-term linear prediction filter 103), where A(z) is called the prediction filter and may be obtained using linear prediction (e.g., Levinson-Durbin algorithm). In one or more embodiments, an all-pole filter may be used because it is a good representation of the human vocal tract and because it is easy to compute.

The short-term linear prediction filter 103 is obtained by analyzing the original signal 101 and represented by a set of coefficients:

$$A(z) = \sum_{i=1}^{P} 1 + a_i \cdot z^{-i},\ i = 1, 2, \ldots\ , P \tag{5}$$

As previously described, regions of voiced speech exhibit long term periodicity. This period, known as pitch, is introduced into the synthesized spectrum by the pitch filter 1/(B(z)). The output of the long-term prediction filter 105 depends on pitch and pitch gain. In one or more embodiments, the pitch may be estimated from the original signal, residual signal, or weighted original signal. In one embodiment, the long-term prediction function (B(z)) may be expressed using Equation (6) as follows.

$$B(z)=1-G_p \cdot z^{-Pitch} \tag{6}$$

The weighting filter 110 is related to the above short-term prediction filter. One of the typical weighting filters may be represented as described in Equation (7).

$$W(z) = \frac{A(z/\alpha)}{1-\beta \cdot z^{-1}} \tag{7}$$

where $\beta<\alpha$, $0<\beta<1$, $0<\alpha\leq 1$.

In another embodiment, the weighting filter W(z) may be derived from the LPC filter by the use of bandwidth expansion as illustrated in one embodiment in Equation (8) below.

$$W(z) = \frac{A(z/\gamma 1)}{A(z/\gamma 2)}, \tag{8}$$

In Equation (8), $\gamma 1>\gamma 2$, which are the factors with which the poles are moved towards the origin.

Accordingly, for every frame of speech, the LPCs and pitch are computed and the filters are updated. For every subframe of speech, the codevector that produces the 'best' filtered output is chosen to represent the subframe. The corresponding quantized value of gain has to be transmitted to the decoder for proper decoding. The LPCs and the pitch values also have to be quantized and sent every frame for reconstructing the filters at the decoder. Accordingly, the coded excitation index, quantized gain index, quantized long-term prediction parameter index, and quantized short-term prediction parameter index are transmitted to the decoder.

Figure 8A:
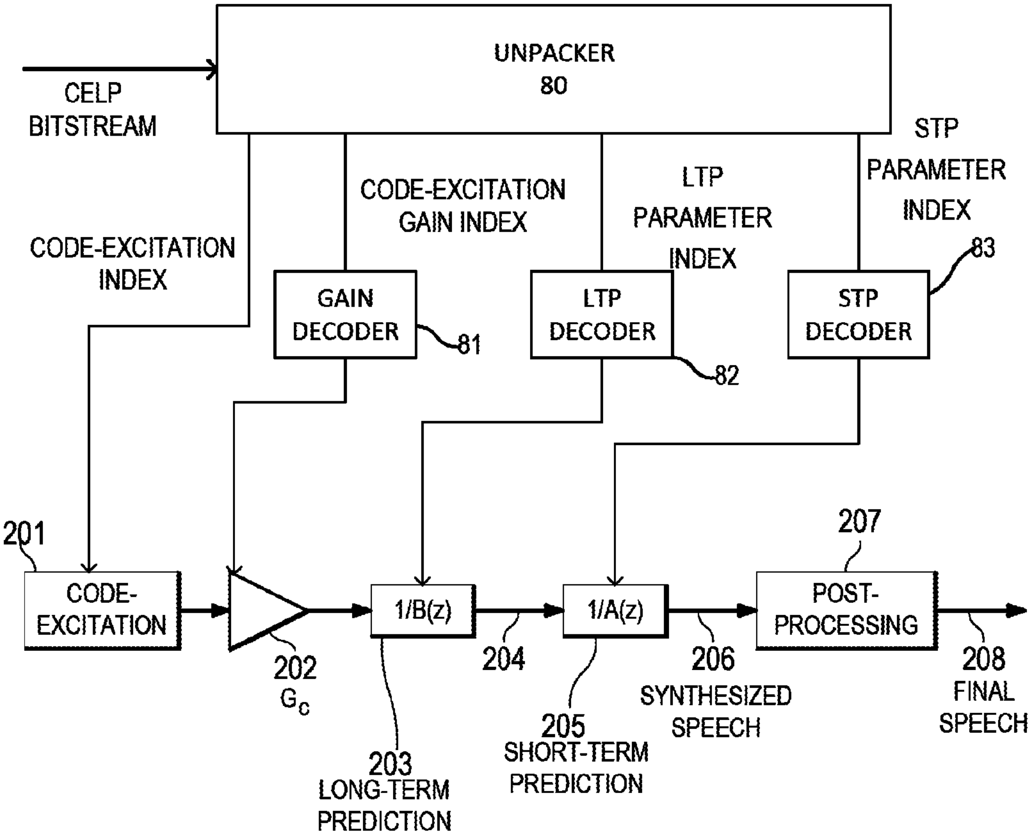
FIG. 8A illustrates operations performed during decoding of an original speech using a CELP decoder in accordance with an embodiment of the present invention.

FIG. 8A illustrates operations performed during decoding of an original speech using a CELP decoder in accordance with an embodiment of the present invention.

The speech signal is reconstructed at the decoder by passing the received codevectors through the corresponding filters. Consequently, every block except post-processing has the same definition as described in the encoder of FIG. 7.

Figure 8B:
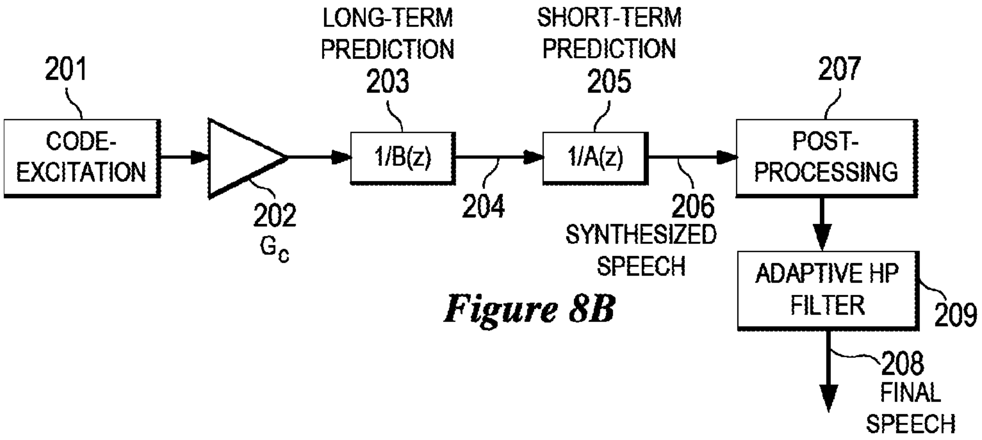
FIG. 8B illustrates operations performed during decoding of an original speech using a CELP decoder in accordance with an alternative embodiment of the present invention.

The coded CELP bitstream is received and unpacked 80 at a receiving device. FIGS. 8A and 8B illustrate the decoder of the receiving device.

For each subframe received, the received coded excitation index, quantized gain index, quantized long-term prediction parameter index, and quantized short-term prediction parameter index, are used to find the corresponding parameters using corresponding decoders, for example, gain decoder 81, long-term prediction decoder 82, and short-term prediction decoder 83. For example, the positions and amplitude signs of the excitation pulses and the algebraic code vector of the code-excitation 402 may be determined from the received coded excitation index.

FIG. 8A illustrates an initial decoder which adds a post-processing block 207 after a synthesized speech 206. The decoder is a combination of several blocks which includes coded excitation 201, long-term prediction 203, short-term prediction 205 and post-processing 207. The post-processing may further comprise short-term post-processing and long-term post-processing.

In one or more embodiments, the post-processing 207 includes an adaptive high pass filter as described in various embodiments. The adaptive high pass filter is configured to determine the first major peak and dynamically determine the appropriate cut-off frequency for the high pass filter.

FIG. 8B illustrates operations performed during decoding of an original speech using a CELP decoder in accordance with an embodiment of the present invention.

In this embodiment, the adaptive high pass filter 209 is implemented after post processing 207. In one or more embodiments, the adaptive high pass filter 209 may be implemented as part of the circuitry and/or program of the post-processing or may be implemented separately.

Figure 9:
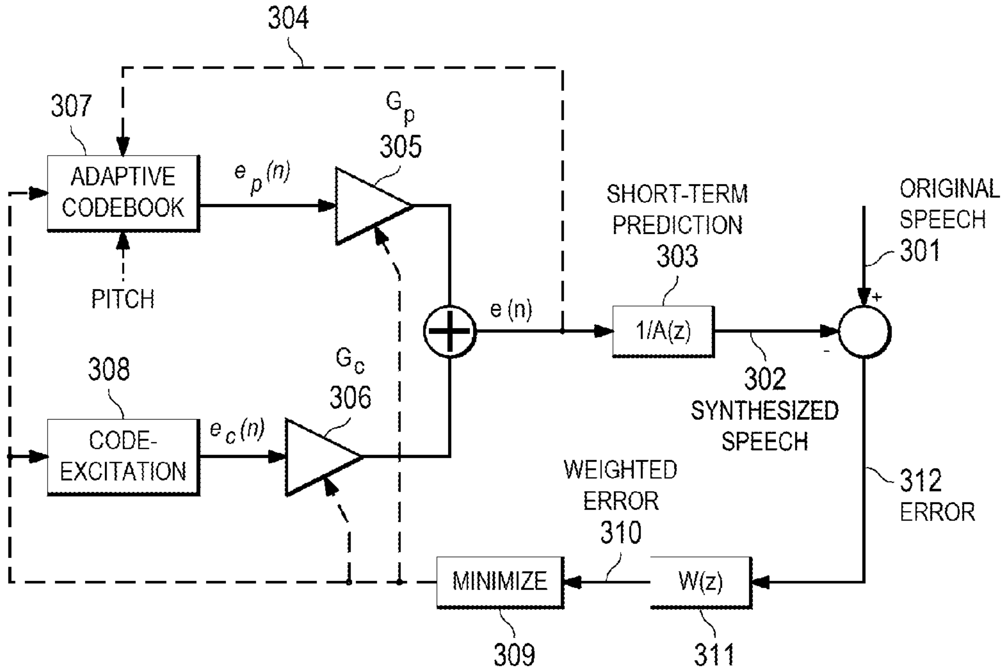
Figure 9 (PRIOR ART)
FIG. 9 illustrates a conventional CELP encoder used in implementing embodiments of the present invention.

FIG. 9 illustrates a conventional CELP encoder used in implementing embodiments of the present invention.

FIG. 9 illustrates a basic CELP encoder using an additional adaptive codebook for improving long-term linear prediction. The excitation is produced by summing the contributions from an adaptive codebook 307 and a code excitation 308, which may be a stochastic or fixed codebook as described previously. The entries in the adaptive codebook comprise delayed versions of the excitation. This makes it possible to efficiently code periodic signals such as voiced sounds.

Referring to FIG. 9, an adaptive codebook 307 comprises a past synthesized excitation 304 or repeating past excitation pitch cycle at pitch period. Pitch lag may be encoded in integer value when it is large or long. Pitch lag is often encoded in more precise fractional value when it is small or short. The periodic information of pitch is employed to generate the adaptive component of the excitation. This excitation component is then scaled by a gain $G_p$ 305 (also called pitch gain).

Long-Term Prediction plays a very important role for voiced speech coding because voiced speech has strong periodicity. The adjacent pitch cycles of voiced speech are similar to each other, which means mathematically the pitch gain $G_p$ in the following excitation express is high or close to 1, $$e(n)=G_p \cdot e_p(n)+G_c \cdot e_c(n) \quad (4)$$

where $e_p(n)$ is one subframe of sample series indexed by n, coming from the adaptive codebook 307 which comprises the past excitation 304; $e_p(n)$ may be adaptively low-pass filtered as low frequency area is often more periodic or more harmonic than high frequency area. $e_c(n)$ is from the coded excitation codebook 308 (also called fixed codebook) which is a current excitation contribution. Further, $e_c(n)$ may also be enhanced such as high pass filtering enhancement, pitch enhancement, dispersion enhancement, format enhancement, etc.

For voiced speech, the contribution of $e_p(n)$ from the adaptive codebook may be dominant and the pitch gain $G_p$ 305 is around a value of 1. The excitation is usually updated for each subframe. Typical frame size is 20 milliseconds and typical subframe size is 5 milliseconds.

As described in FIG. 7, the fixed coded excitation 308 is scaled by a gain $G_c$ 306 before going through the linear filters. The two scaled excitation components from the fixed coded excitation 108 and the adaptive codebook 307 are added together before filtering through the short-term linear prediction filter 303. The two gains ($G_p$ and $G_c$) are quantized and transmitted to a decoder. Accordingly, the coded excitation index, adaptive codebook index, quantized gain indices, and quantized short-term prediction parameter index are transmitted to the receiving audio device.

Figure 10A:
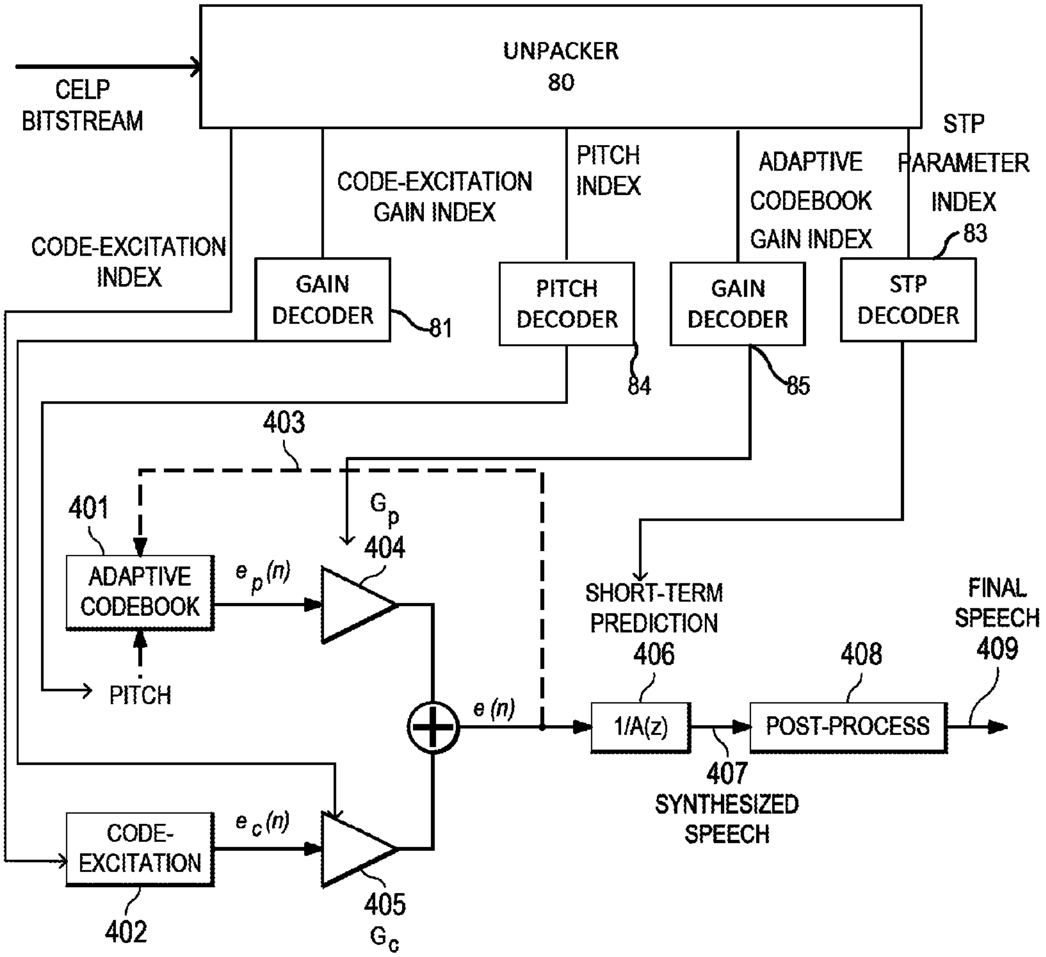
FIG. 10A illustrates a basic CELP decoder corresponding to the encoder in FIG. 9 in accordance with an embodiment of the present invention.
Figure 10B:
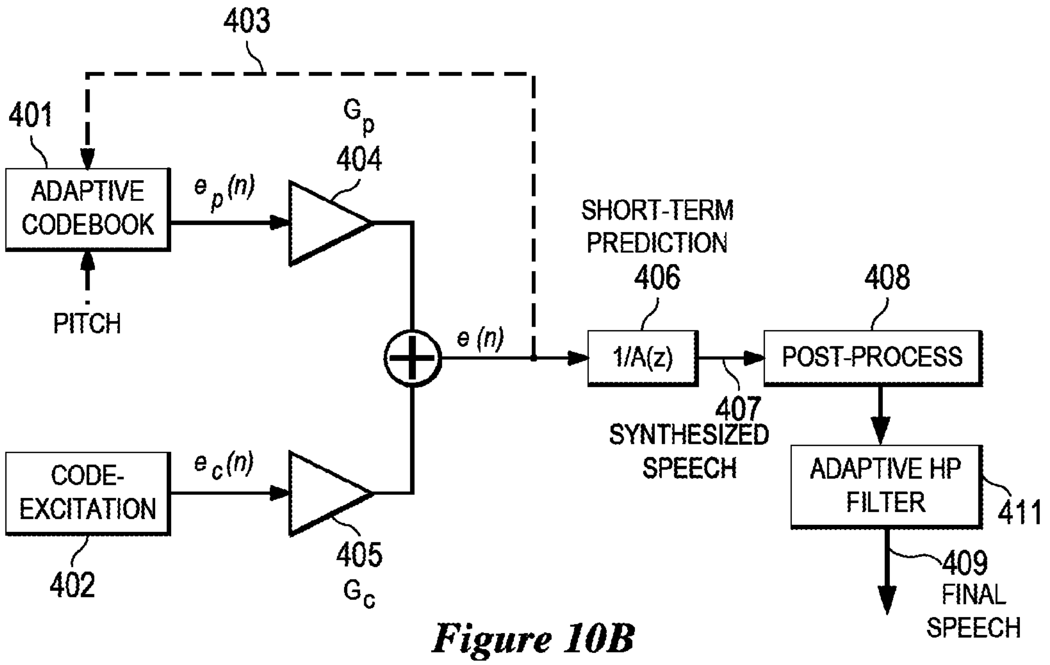
FIG. 10B illustrates a basic CELP decoder corresponding to the encoder in FIG. 9 in accordance with an embodiment of the present invention.

The CELP bitstream coded using a device illustrated in FIG. 9 is received at a receiving device. FIGS. 10A and 10B illustrate the decoder of the receiving device.

FIG. 10A illustrates a basic CELP decoder corresponding to the encoder in FIG. 9 in accordance with an embodiment of the present invention. FIG. 10A includes a post-processing block 408 comprising an adaptive high-pass filter receiving the synthesized speech 407 from the main decoder. This decoder is similar to FIG. 8A except the adaptive codebook 307.

For each subframe received, the received coded excitation index, quantized coded excitation gain index, quantized pitch index, quantized adaptive codebook gain index, and quantized short-term prediction parameter index, are used to find the corresponding parameters using corresponding decoders, for example, gain decoder 81, pitch decoder 84, adaptive codebook gain decoder 85, and short-term prediction decoder 83.

In various embodiments, the CELP decoder is a combination of several blocks and comprises coded excitation 402, adaptive codebook 401, short-term prediction 406, and post-processing 408. Every block except post-processing has the same definition as described in the encoder of FIG. 9. The post-processing may further consist of short-term post-processing and long-term post-processing.

FIG. 10B illustrates a basic CELP decoder corresponding to the encoder in FIG. 9 in accordance with an embodiment of the present invention. In this embodiment, similar to the embodiment of FIG. 8B, the adaptive high pass filter 411 is added after post processing 408.

Figure 11:
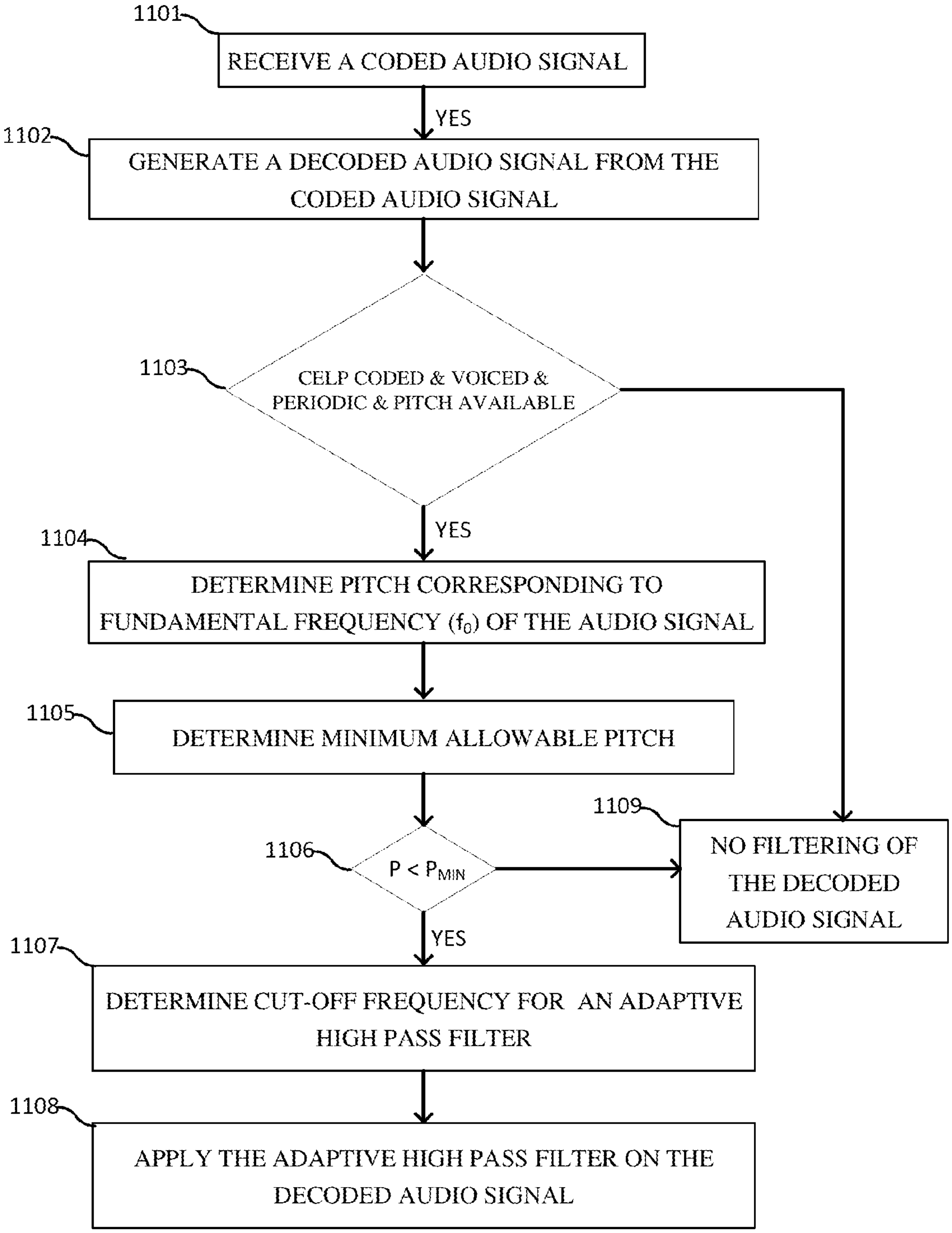
FIG. 11 illustrates a schematic of a method of speech processing performed at a CELP decoder in accordance with embodiments of the present invention.

FIG. 11 illustrates a schematic of a method of speech processing performed at a CELP decoder in accordance with embodiments of the present invention.

Referring to box 1101, a coded audio signal comprising coding noise is received at the receiving media or audio device. A decoded audio signal from the coded audio signal is generated from the coded audio signal (step 1102).

The audio signal is evaluated (step 1103) to see whether it is coded using a CELP coder, whether it is a VOICED speech signal, whether, it is a periodic signal, and whether pitch data is available. If none of the above is satisfied, no adaptive high-pass filtering is performed during post-processing (step 1109). However, if all the above is true, a pitch (P) corresponding to the fundamental frequency ($f_0$) and the minimum allowable pitch ($P_{MIN}$) for the CELP algorithm are obtained (steps 1104 and 1105). The maximum allowable fundamental frequency ($F_M$) may be obtained from the minimum allowable pitch. The high pass filter will be applied only if the pitch is less than the minimum allowable pitch (step 1106) (alternatively only if the fundamental frequency is greater than the maximum fundamental frequency). If the high pass filter is to be applied, the cut-off frequency is dynamically determined (step 1107). In various embodiments, the cut-off frequency is lower than the fundamental frequency so that coding noise below the fundamental frequency is eliminated or at least reduced. The adaptive high-pass filter is applied to the decoded audio signal to reduce coding noise that is present below the cut-off frequency. The reduction in coding noise (i.e., amplitude after conversion in time domain) is at least 10×, and about 5×-10,000× in various embodiments.

Figure 12:
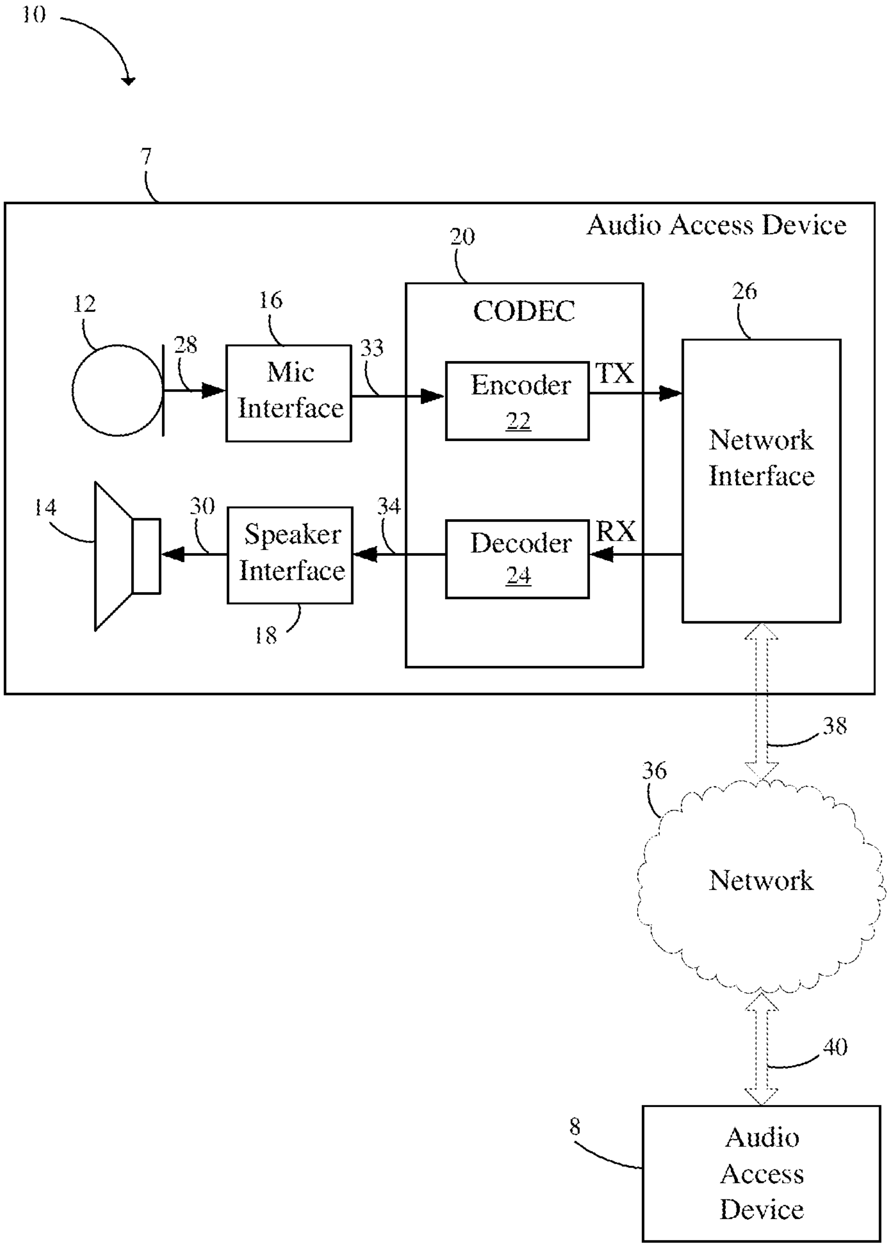
FIG. 12 illustrates a communication system 10 according to an embodiment of the present invention.

FIG. 12 illustrates a communication system 10 according to an embodiment of the present invention.

Communication system 10 has audio access devices 7 and 8 coupled to a network 36 via communication links 38 and 40. In one embodiment, audio access device 7 and 8 are voice over internet protocol (VOIP) devices and network 36 is a wide area network (WAN), public switched telephone network (PTSN) and/or the internet. In another embodiment, communication links 38 and 40 are wireline and/or wireless broadband connections. In an alternative embodiment, audio access devices 7 and 8 are cellular or mobile telephones, links 38 and 40 are wireless mobile telephone channels and network 36 represents a mobile telephone network. The audio access device 7 uses a microphone 12 to convert sound, such as music or a person's voice into an analog audio input signal 28. A microphone interface 16 converts the analog audio input signal 28 into a digital audio signal 33 for input into an encoder 22 of a CODEC 20. The encoder 22 produces encoded audio signal TX for transmission to a network 26 via a network interface 26 according to embodiments of the present invention. A decoder 24 within the CODEC 20 receives encoded audio signal RX from the network 36 via network interface 26, and converts encoded audio signal RX into a digital audio signal 34. The speaker interface 18 converts the digital audio signal 34 into the audio signal 30 suitable for driving the loudspeaker 14.

In embodiments of the present invention, where audio access device 7 is a VOIP device, some or all of the components within audio access device 7 are implemented within a handset. In some embodiments, however, microphone 12 and loudspeaker 14 are separate units, and microphone interface 16, speaker interface 18, CODEC 20 and network interface 26 are implemented within a personal computer. CODEC 20 can be implemented in either software running on a computer or a dedicated processor, or by dedicated hardware, for example, on an application specific integrated circuit (ASIC). Microphone interface 16 is implemented by an analog-to-digital (A/D) converter, as well as other interface circuitry located within the handset and/or within the computer. Likewise, speaker interface 18 is implemented by a digital-to-analog converter and other interface circuitry located within the handset and/or within the computer. In further embodiments, audio access device 7 can be implemented and partitioned in other ways known in the art.

In embodiments of the present invention where audio access device 7 is a cellular or mobile telephone, the elements within audio access device 7 are implemented within a cellular handset. CODEC 20 is implemented by software running on a processor within the handset or by dedicated hardware. In further embodiments of the present invention, audio access device may be implemented in other devices such as peer-to-peer wireline and wireless digital communication systems, such as intercoms, and radio handsets. In applications such as consumer audio devices, audio access device may contain a CODEC with only encoder 22 or decoder 24, for example, in a digital microphone system or music playback device. In other embodiments of the present invention, CODEC 20 can be used without microphone 12 and speaker 14, for example, in cellular base stations that access the PTSN.

The adaptive high pass filter described in various embodiments of the present invention may be part of the decoder 24. The adaptive high-pass filter may be implemented in hardware or software in various embodiments. For example, the decoder 24 including the adaptive high pass filter may be part of a digital signal processing (DSP) chip.

Figure 13:
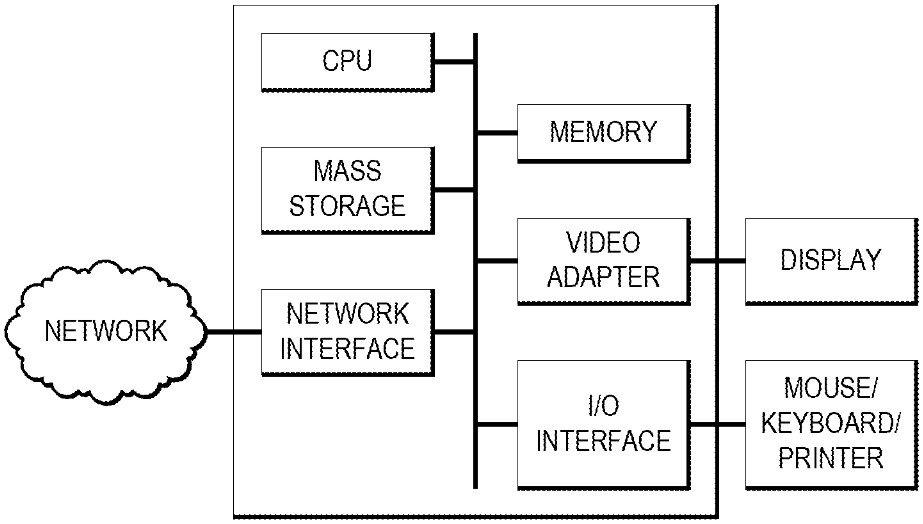
FIG. 13 illustrates a block diagram of a processing system that may be used for implementing the devices and methods disclosed herein.

FIG. 13 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, various embodiments described above may be combined with each other.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps The following is an example embodiment of a subroutine of an adaptive high-pass post-filtering for short pitch signal.

```
/*-------------------------------------------------------------------*
 * shortpit_psfilter( )
 *
 * Addditional post-filter for short pitch signal
 *-------------------------------------------------------------------*/
 void shortpit_psfilter(
   float synth_in[ ],         /* i : input synthesis (at 16kHz)          */
   float synth_out[ ],        /* o : postfiltered synthesis (as 16kHz)   */
 const short L_frame,         /* i : length of the frame                 */
   float old_pitch_buf[ ],    /* i : pitch for every subfr [0,1,2,3]     */
 const short bpf_off,         /* i : do not use postfilter when set to 1 */
 const int core_brate         /* i : core bit rate                       */
     )
     {
     static float PostFiltMem[2]={0,0}, alfa_sm=0, f0_sm=0;
     float x, FiltN[2], FiltD[2], f0, alfa, pit;
     short j;
     if( (old_pitch_buf == NULL) || bpf_off )
     {
         alfa = 0.f;
         f0 = 1.f/PIT16k_MIN;
     }
     else {
         pit = old_pitch_buf[0];
         if (core_brate < ACELP_22k60) {
           pit *= 1.25f;
         }
         alfa = (float)(pit<PIT16k_MIN);
         f0 = 1.f/min(pit,PIT16k_MIN);
     }
     if (L_frame==L_FRAME32k) {
         f0 *= 0.5f;
     }
     if (L_frame==L_FRAME48k) {
         f0 *= (1/3.f);
     }
     if (core_brate >= ACELP_22k60) {
         if (alfa>alfa_sm) {
             alfa_sm = 0.9f*alfa_sm + 0.1f*alfa;
         }
         else {
             alfa_sm = max(0, alfa_sm-0.02f);
         }
     }
```

-continued

```
     else {
         if (alfa>alfa_sm) {
             alfa_sm = 0.8f*alfa_sm + 0.2f*alfa;
         }
         else {
             alfa_sm = max(0, alfa_sm-0.01f);
         }
     }
     f0_sm = 0.95f*f0_sm + 0.05f*f0;
     FiltN[0] = (-2*0.9f)*alfa_sm;
     FiltN[1] = (0.9f*0.9f)*alfa_sm*alfa_sm;
     FiltD[0] = (-2*0.87f*(float)cos(PI2*0.9f*f0_sm))*alfa_sm;
     FiltD[1] = (0.87f*0.87f)*alfa_sm*alfa_sm;
     for (j=0;j<L_frame;j++)
     {
         x = synth_in[j] - FiltD[0]*PostFiltMem[0] -
         FiltD[1]*PostFiltMem[1];
         synth_out[j] = x + FiltN[0]*PostFiltMem[0] +
         FiltN[1]*PostFiltMem[1];
         PostFiltMem[1]=PostFiltMem[0];
         PostFiltMem[0] = x;
     }
     return;
       }
```

What is claimed is:

1. A method of speech processing using a code excitation linear prediction (CELP) algorithm, the method comprising:
   receiving a coded audio signal comprising coding noise;
   generating a decoded audio signal from the coded audio signal;
   determining a pitch corresponding to a fundamental frequency of the decoded audio signal;
   determining a minimum allowable pitch for the CELP algorithm;
   determining whether the pitch of the decoded audio signal is less than the minimum allowable pitch; and
   when the pitch of the decoded audio signal is less than the minimum allowable pitch, applying an adaptive high pass filter on the decoded audio signal to lower coding noise at frequencies below the fundamental frequency;
   when the pitch of the decoded audio signal is greater than the minimum allowable pitch, not applying the adaptive high pass filter on the decoded audio signal so as to not process the decoded audio signal;
   converting the decoded audio signal for which the adaptive high pass filter is applied or the decoded audio signal for which the adaptive high pass filter is not applied into an output audio signal by a speaker interface; and
   outputting, by a speaker, the converted output audio signal.

2. The method of claim 1, wherein the adaptive high pass filter is included in a code-excited linear prediction (CELP) decoder.

3. The method of claim 1, further comprising:
   determining whether the audio signal is a voiced speech signal; and
   not applying the adaptive high pass filter when the decoded audio signal is determined to be not a voiced speech signal.

4. The method of claim 1, further comprising:
   determining whether the audio signal was coded using a CELP encoder; and
   not applying the adaptive high pass filter on the decoded audio signal when the decoded audio signal was not coded using a CELP encoder.

5. The method of claim 1, wherein a cut-off frequency of the adaptive high pass filter is less than the fundamental frequency.

6. The method of claim 5, wherein the adaptive high pass filter is a second order high-pass filter.

7. The method of claim 6, wherein the adaptive high pass filter is given by the equation $$F_{HP}(z)=\frac{1+a_0z^{-1}+a_1z^{-2}}{1+b_0z^{-1}+b_1z^{-2}},$$
$$a_0=-2\cdot r_0\cdot\alpha_{sm},$$
$$a_1=r_0\cdot r_0\cdot\alpha_{sm}\cdot\alpha_{sm},$$
$$b_0=-2\cdot r_1\cdot\alpha_{sm}\cdot\cos(2\pi\cdot 0.9F_{0\_sm}),$$
$$b_1=r_1\cdot r_1\cdot\alpha_{sm}\cdot\alpha_{sm},$$

wherein $r_0$ is a constant representing the largest distance between zeros and the center on z-plane, wherein $r_1$ is a constant representing the largest distance between poles and the center on z-plane, wherein $F_{0\_sm}$ is related to the fundamental frequency of a short pitch signal, and wherein $\alpha_{sm}$ ($0\le\alpha_{sm}\le1$) is a controlling parameter to adaptively reduce a distance between the poles and the center on z-plane.

8. The method of claim 1, wherein a first subframe of a frame of the coded audio signal is coded in a full range from a minimum pitch limit to a maximum pitch limit, and wherein the minimum allowable pitch is the minimum pitch limit of the CELP algorithm.

9. A method of speech processing using a code excitation linear prediction (CELP) algorithm, the method comprising:
receiving a voiced wideband spectrum comprising coding noise;
determining a pitch corresponding to a fundamental frequency of the voiced wideband spectrum;
determining a minimum allowable pitch for the CELP algorithm;
determining whether the pitch of the voiced wideband spectrum is less than the minimum allowable pitch;
when the pitch of the voiced wideband spectrum is less than the minimum allowable pitch, applying an adaptive high pass filter having a cut-off frequency less than the fundamental frequency on the voiced wideband spectrum to lower coding noise at frequencies below the fundamental frequency;
when the pitch of the voiced wideband spectrum is greater than the minimum allowable pitch, not applying the adaptive high pass filter on the voiced wideband spectrum;
converting the voiced wideband spectrum for which the adaptive high pass filter is applied or the voiced wideband spectrum for which the high pass filter is not applied into an output audio signal by a speaker interface; and
outputting, by a speaker, the converted output audio signal.

10. The method of claim 9, wherein the voiced wideband spectrum is a synthesized speech output of a code-excited linear prediction (CELP) decoder.

11. The method of claim 9, further comprising:
determining whether the voiced wideband spectrum was coded using a CELP encoder; and
wherein the adaptive high pass filter is configured to not modify the voiced wideband spectrum when the voiced wideband spectrum was not coded using a CELP encoder.

12. The method of claim 9, wherein the cut-off frequency of the adaptive high pass filter is less than the fundamental frequency.

13. The method of claim 12, wherein the adaptive high pass filter is a second order high-pass filter.

14. The method of claim 13, wherein the adaptive high pass filter is given by the equation $$F_{HP}(z)=\frac{1+a_0z^{-1}+a_1z^{-2}}{1+b_0z^{-1}+b_1z^{-2}},$$
$$a_0=-2\cdot r_0\cdot\alpha_{sm},$$
$$a_1=r_0\cdot r_0\cdot\alpha_{sm}\cdot\alpha_{sm},$$
$$b_0=-2\cdot r_1\cdot\alpha_{sm}\cdot\cos(2\pi\cdot 0.9F_{0\_sm}),$$
$$b_1=r_1\cdot r_1\cdot\alpha_{sm}\cdot\alpha_{sm},$$

wherein $r_0$ is a constant representing the largest distance between zeros and the center on z-plane, wherein $r_1$ is a constant representing the largest distance between the poles and the center on z-plane, wherein $F_{0\_sm}$ is related to the fundamental frequency of a short pitch signal, and wherein $\alpha_{sm}$ ($0\le\alpha_{sm}\le1$) is a controlling parameter to adaptively reduce a distance between the poles and the center on z-plane.

15. An audio processing apparatus comprising:
a memory storing a program;
a processor for executing the program, the program comprising instructions for a code excitation linear predictive (CELP) decoder, the instructions for the CELP decoder comprising:
an excitation codebook for outputting a first excitation signal of a speech signal;
a first gain stage for amplifying the first excitation signal from the excitation codebook;
an adaptive codebook for outputting a second excitation signal of the speech signal;
a second gain stage for amplifying the second excitation signal from the adaptive codebook;
an adder for adding the amplified first excitation code vector with the amplified second excitation code vector;
a short term prediction filter configured to filter the output of the adder and output a synthesized speech signal;
an adaptive high pass filter coupled to the output of the short term prediction filter, the adaptive high filter comprising an adjustable cut-off frequency to dynamically filter out coding noise below the fundamental frequency in the synthesized speech signal, wherein the adaptive high pass filter is configured to be applied on the synthesized speech signal when the fundamental frequency of the synthesized speech signal is greater than a maximum allowable fundamental frequency, and wherein the adaptive high pass filter is configured to be not applied on the synthesized speech signal when the fundamental frequency of the synthesized speech signal is less than the maximum allowable fundamental frequency;
a speaker interface configured to convert the synthesized speech signal for which the adaptive high pass filter is applied or the synthesized speech signal for which the adaptive high pass filter is not applied into an output audio signal; and
a speaker configured to output the converted output audio signal.

16. The audio processing apparatus of claim 15, wherein the adaptive high pass filter is configured to not modify the synthesized speech signal when the speech signal was not coded using a CELP encoder.

17. The audio processing apparatus of claim 15, wherein the adaptive high pass filter is given by the equation $$F_{HP}(z) = \frac{1 + a_0 z^{-1} + a_1 z^{-2}}{1 + b_0 z^{-1} + b_1 z^{-2}},$$

$$a_0 = -2 \cdot r_0 \cdot \alpha_{sm},$$

$$a_1 = r_0 \cdot r_0 \cdot \alpha_{sm} \cdot \alpha_{sm},$$

$$b_0 = -2 \cdot r_1 \cdot \alpha_{sm} \cdot \cos(2\pi \cdot 0.9 F_{0\_sm}),$$

$$b_1 = r_1 \cdot r_1 \cdot \alpha_{sm} \cdot \alpha_{sm},$$

wherein $r_0$ is a constant representing the largest distance between zeros and the center on z-plane, wherein $r_1$ is a constant representing the largest distance between the poles and the center on z-plane, wherein $F_{0\_sm}$ is related to the fundamental frequency of a short pitch signal, and wherein $\alpha_{sm}$ ($0 \leq \alpha_{sm} \leq 1$) is a controlling parameter to adaptively reduce a distance between the poles and the center on z-plane.

* * * * *